United States Patent
Willinger

(10) Patent No.: US 7,429,321 B2
(45) Date of Patent: Sep. 30, 2008

(54) AQUARIUM FILTER CARTRIDGE AND FILTRATION SYSTEM

(75) Inventor: Jonathan Willinger, Tenafly, NJ (US)

(73) Assignee: JW Pet Company, Inc., Teterboro, NJ (US)

( * ) Notice: Subject to any disclaimer, the term of this patent is extended or adjusted under 35 U.S.C. 154(b) by 259 days.

(21) Appl. No.: 11/243,912

(22) Filed: Oct. 5, 2005

(65) Prior Publication Data

US 2007/0075004 A1   Apr. 5, 2007

(51) Int. Cl.
A01K 63/04 (2006.01)
B01D 35/027 (2006.01)
B01D 27/00 (2006.01)
B01D 29/56 (2006.01)

(52) U.S. Cl. .............. 210/167.21; 210/167.27; 210/336; 210/489; 119/259

(58) Field of Classification Search ............ 210/167.21, 210/167.25, 167.27, 282, 336, 488, 489; 119/259
See application file for complete search history.

(56) References Cited

U.S. PATENT DOCUMENTS

| | | | | |
|---|---|---|---|---|
| 526,695 A | * | 10/1894 | Emery | 210/252 |
| 2,275,428 A | * | 3/1942 | Haldeman | 210/167.26 |
| 2,359,985 A | * | 10/1944 | Gordon | 210/336 |
| 2,369,915 A | * | 2/1945 | Quinn | 210/232 |
| 2,652,151 A | * | 9/1953 | Legus | 210/473 |
| 3,715,035 A | * | 2/1973 | Teeple, Jr. et al. | 210/249 |
| 4,303,521 A | * | 12/1981 | Lehmann | 210/282 |
| 4,783,258 A | | 11/1988 | Willinger et al. | |
| 5,290,436 A | * | 3/1994 | Danner | 210/167.27 |
| 5,522,987 A | * | 6/1996 | Bresolin | 210/167.27 |
| 5,861,093 A | * | 1/1999 | Bennett | 210/167.04 |
| 6,224,766 B1 | * | 5/2001 | Yamato et al. | 210/321.75 |
| 6,797,163 B2 | * | 9/2004 | Carley et al. | 210/167.22 |
| 2004/0050759 A1 | * | 3/2004 | Ogawa | 210/97 |
| 2004/0094470 A1 | * | 5/2004 | Jackson | 210/411 |

FOREIGN PATENT DOCUMENTS

| | | | |
|---|---|---|---|
| CH | 621614 | * | 2/1981 |
| CN | 1582649 | | 2/2005 |

OTHER PUBLICATIONS

Chinese Office Action with translation dated Dec. 21, 2007 from the corresponding Chinese Patent Application 200610007349.3.

* cited by examiner

Primary Examiner—Fred Prince
(74) Attorney, Agent, or Firm—Katten Muchin Rosenman LLP

(57) ABSTRACT

An aquarium filter cartridge including activated carbon or the like and a housing wherein the water traces an S-shaped path is disclosed. In the S-shaped path the water flows horizontally through a floss type filter, downward to the bottom of the housing, horizontally into the bottom of the carbon cartridge, up through the carbon filter, and out the top or upper side of the housing back into the aquarium.

41 Claims, 8 Drawing Sheets

//]: #

AQUARIUM FILTER CARTRIDGE AND FILTRATION SYSTEM

BACKGROUND OF THE INVENTION

1. Field of the Invention

The present invention relates to aquarium filtration systems, and more particularly to external aquarium filtration systems with a removable filter cartridges.

2. Background

External aquarium filters pull water from the aquarium tank and pass the water through various physical, chemical, and biological filters. Mechanical filtering typically uses a floss material or the like to screen and remove solid waste material and debris. Chemical filtration reduces ammonia levels using carbon (charcoal) or zeolite. Biological filtration reduces harmful levels of undesirable bacteria using thermoplastic tubules for aerobic bacterial growth. These filtration systems and biological filtration in particular, are improved by increasing the amount of time the water remains in contact with the filtration medium. This time is referred to as "dwell time."

Conventional filters that use removable/disposable filter cartridges, such as that available with the commercially available Whisper Power Filter or the Marineland Penguin Filter, typically are only able to put the water to be cleaned through a relatively thin layer of cartridge with carbon held within the cartridge. The amount of dwell time of the water within the cartridge in contact with the filter material is therefore limited. In contrast, the AquaClear filter manufactured by the Hagen Corporation, which does not use cartridges, brings water to be filtered from the bottom of the filter through a sponge layer and then through a bag of carbon or other filter material. The water rises up from the bottom of the filter and, under pressure, overflows back into the tank. While this design advantageously increases dwell time, it does so at the expense of the user's convenience. Compared with cartridge filters, this design requires substantial more time and inconvenience to change filter material.

A need, therefore, exists for a filtration system that both provides the convenience of a disposable cartridge filtration system and the improved performance of a system that has an improved dwell time.

SUMMARY OF THE INVENTION

An aquarium filtration system configured in accordance with the present invention successfully addresses these needs. In some embodiments of the invention, a removable filter cartridge for cleaning aquarium water in an external-type aquarium filter system is provided. The system includes a canister and a spillway. The filter cartridge includes a housing having a first and a second spaced-apart walls, an entrance at a lower portion of the first wall, the entrance having a lowermost portion and an uppermost portion, the lowermost portion being disposed substantially at a bottom of the canister, an exit at an upper portion of the second wall, the exit having a lowermost portion and an uppermost portion, the lowermost portion of the exit being substantially level with the spillway, and a filtration medium for providing filtration functions for the aquarium water, the filtration medium disposed in a space defined between the first wall and the second wall. Therein, the water follows a substantially S-shaped path between entering the filter cartridge from the canister and exiting the filter cartridge to the spillway.

These and other features and aspects of the present invention will be better understood with reference to the following description of exemplary embodiments, drawing, and the appended claims.

DETAILED DESCRIPTION

Figure 1:
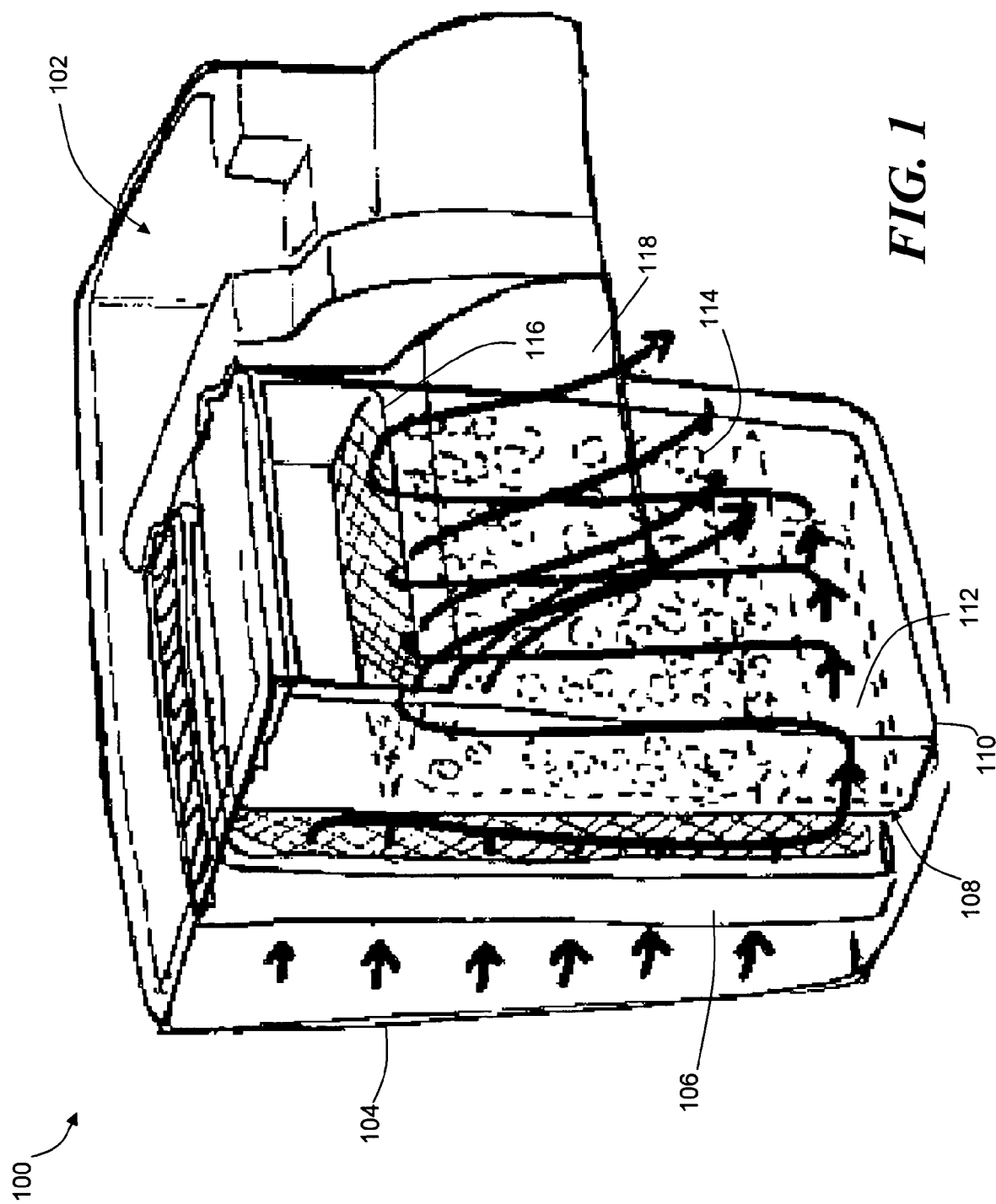
FIG. 1 illustrates a perspective view of an example aquarium filtration system according to embodiments of the present invention.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, left, right, up, down, over, above, below, beneath, rear, and front may be used with respect to the drawings. These and similar directional terms should not be construed to limit the scope of the invention in any manner. The words "attach," "connect," "couple," and similar terms with their inflectional morphemes do not necessarily denote direct and immediate connections, but also include connections through mediate elements or devices.

The present invention provides an aquarium filtration assembly that includes removable filter elements. A first mechanical screen including floss precedes a cartridge which provides chemical and biological filtration. Thus, the user of the present invention is provided with two easily accessed, disposed of, and/or replaced filtration elements.

Figure 2:
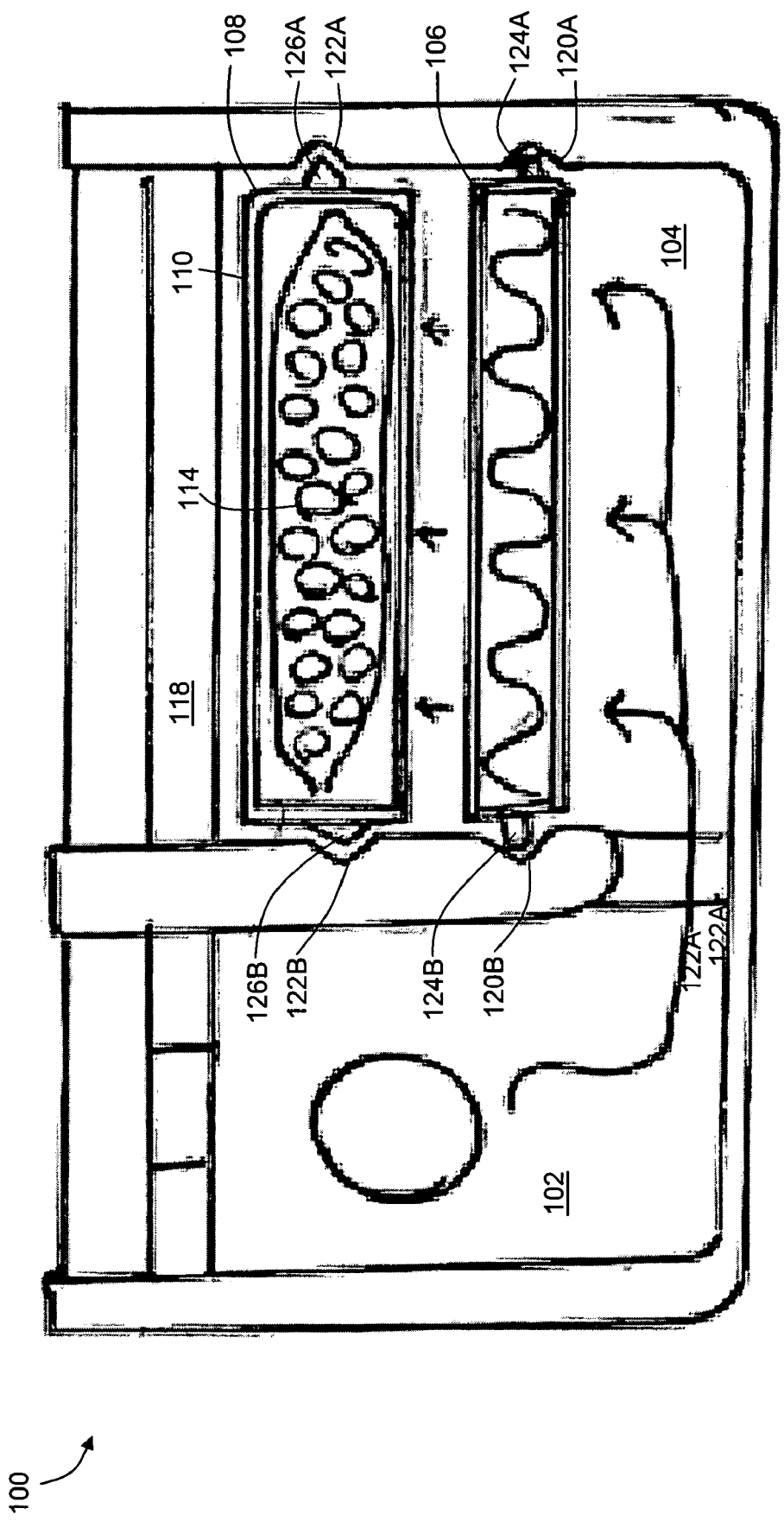
FIG. 2 illustrates a top plan view of the example aquarium filtration system illustrated in FIG. 1.
Figure 3:
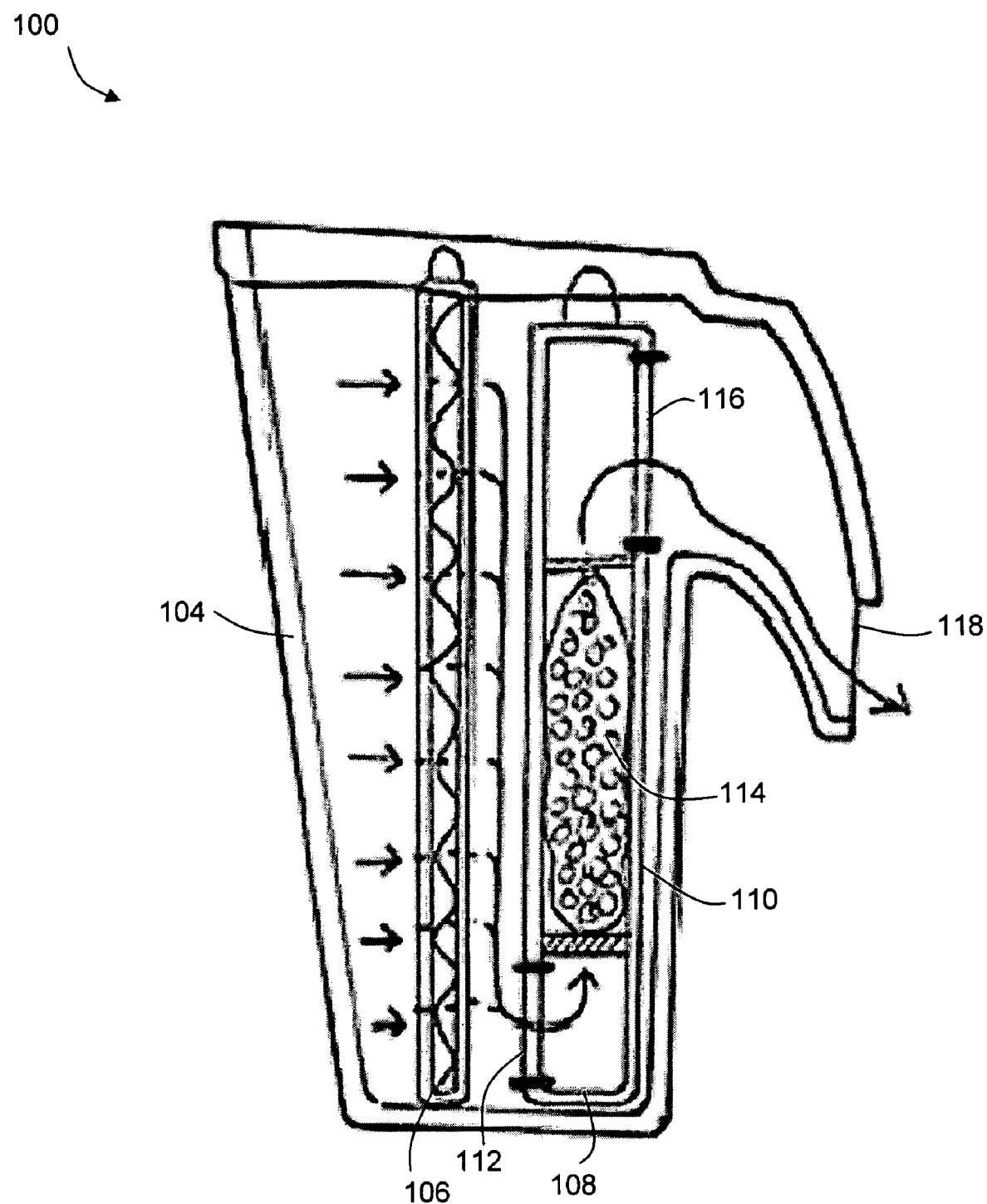
FIG. 3 illustrates a side plan view of the example aquarium filtration system illustrated in FIG. 1.

Turning now to FIGS. 1 through 3, perspective, top, and side views, respectively, of an example embodiment of an inventive filtration assembly 100 of an aquarium filtration system are depicted. Although not shown, the sidewall of an aquarium supports the filtration assembly 100, most of which is adapted to hang external to the aquarium. The filtration assembly 100 includes a water intake chamber 102 that receives unfiltered aquarium water from a pump (e.g., an impeller) (not shown). The water intake chamber 102 is in fluid communication with a canister 104 that is adapted to laterally support a removable panel screening filter 106 and a removable filter cartridge 108. After passing through the panel screening filter 106, water enters the housing 110 of the filter cartridge 108 via the lower entrance 112, passes through a filtration medium 114, and exits the filter cartridge 108 via the upper exit 116. Filtered water leaves the cartridge via exit 116 is then returned to the aquarium via a spillway 118.

Note that the flow of water is represented in FIGS. 1 through 3 by arrows. It can be seen in FIG. 3 that the path of water being filtered by the filter cartridge 108 has an S-shape between entering the filter cartridge 108 from the canister 104 and exiting the filter cartridge 108 to the spillway 118. In total, water flows horizontally through the panel screening filter 106 (e.g., a floss type filter), downward to the bottom of the housing 110, horizontally into the bottom of the filter cartridge 108 (e.g., a carbon cartridge), up through the filtration medium 114 (e.g., a carbon filter), and out the top to the spillway 118.

The advantage of this S-shaped water path is that it is longer than the water paths known in the art. The present invention advantageously increases the amount of "dwell time" the water is in contact with the filtration medium 114 and at the same time provides a convenient disposable cartridge-based filter that is easy to access, replace, and/or clean. It is an additional advantage of the present invention that biological filtration is greatly facilitated by a longer water path with greater dwell time. It is a further advantage that the cartridge comprises an entrance and an exit situated to take maximum advantage of fluid dynamics present in the canister so as to optimize the filtration pump and/or power being consumed.

In some embodiments, the filtration assembly 100 of the present invention may be molded from light weight plastic. A clear plastic may be preferred to better facilitate cleaning the filtration assembly 100 or to allow a user to more easily determine the need to clean or replace the filtration medium 114. As can be seen in FIG. 2, the canister 104 may include support grooves 120A, 120B, 122A, 122B to receive tabs 124A, 124B, 126A, 126B of the panel screening filter 106 and the filter cartridge 108, respectively.

In some embodiments, additional grooves may be included to provide lateral support for additional filter stages. In alternative embodiments, the panel screening filter 106 and the filter cartridge 108 may include a mechanism to allow them to be coupled together and thus, provide support to each other and/or only use one pair of support grooves.

In some embodiments, both the panel screening filter 106 and the filter cartridge 108 may be parts of one assembly that can be disposed of as one unit or serviced with a new floss and/or new charcoal.

Figure 4:
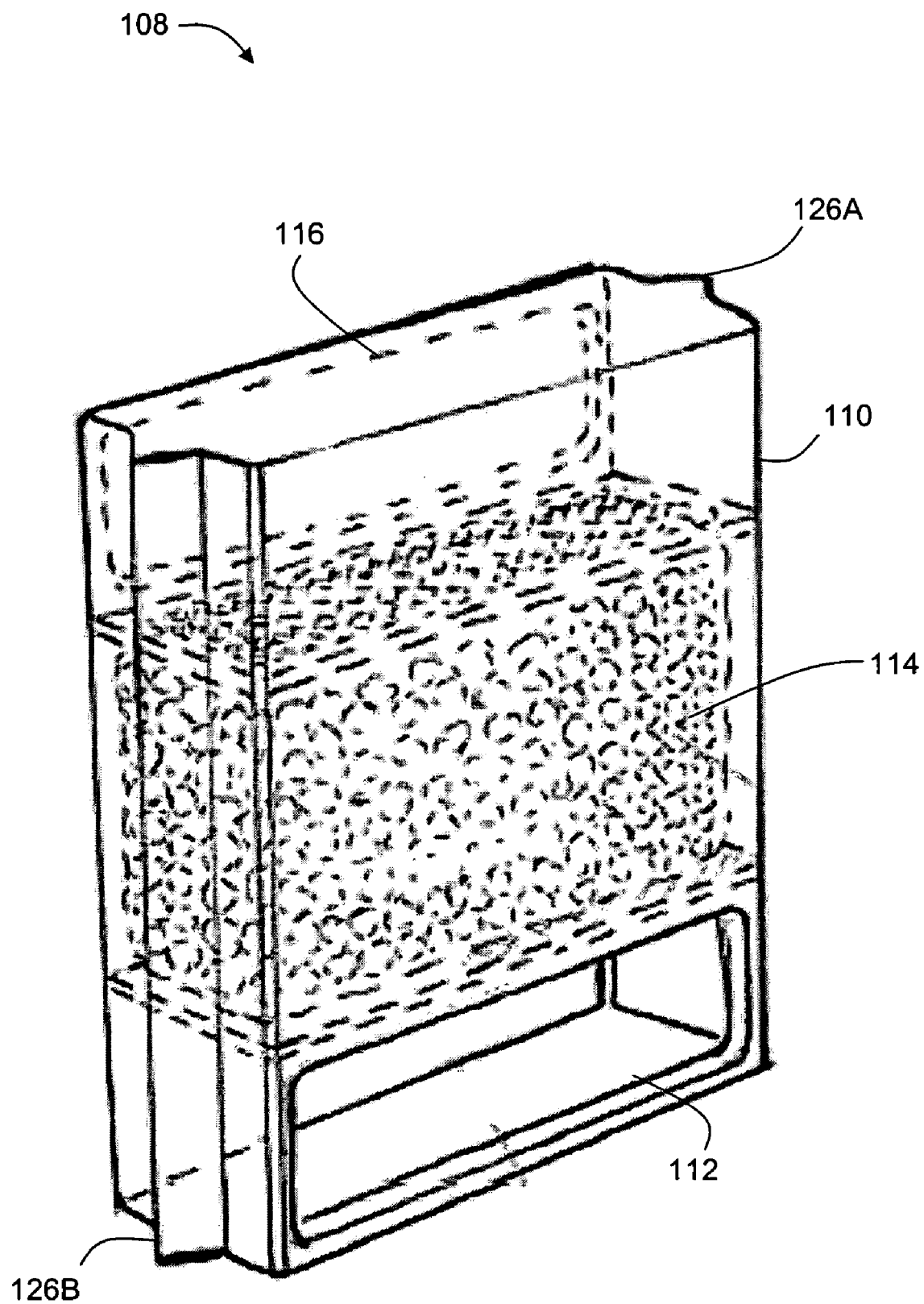
FIG. 4 illustrates a rear perspective view of an example aquarium filter cartridge according to embodiments of the present invention for use in the aquarium filtration system of FIG. 1.
Figure 5:
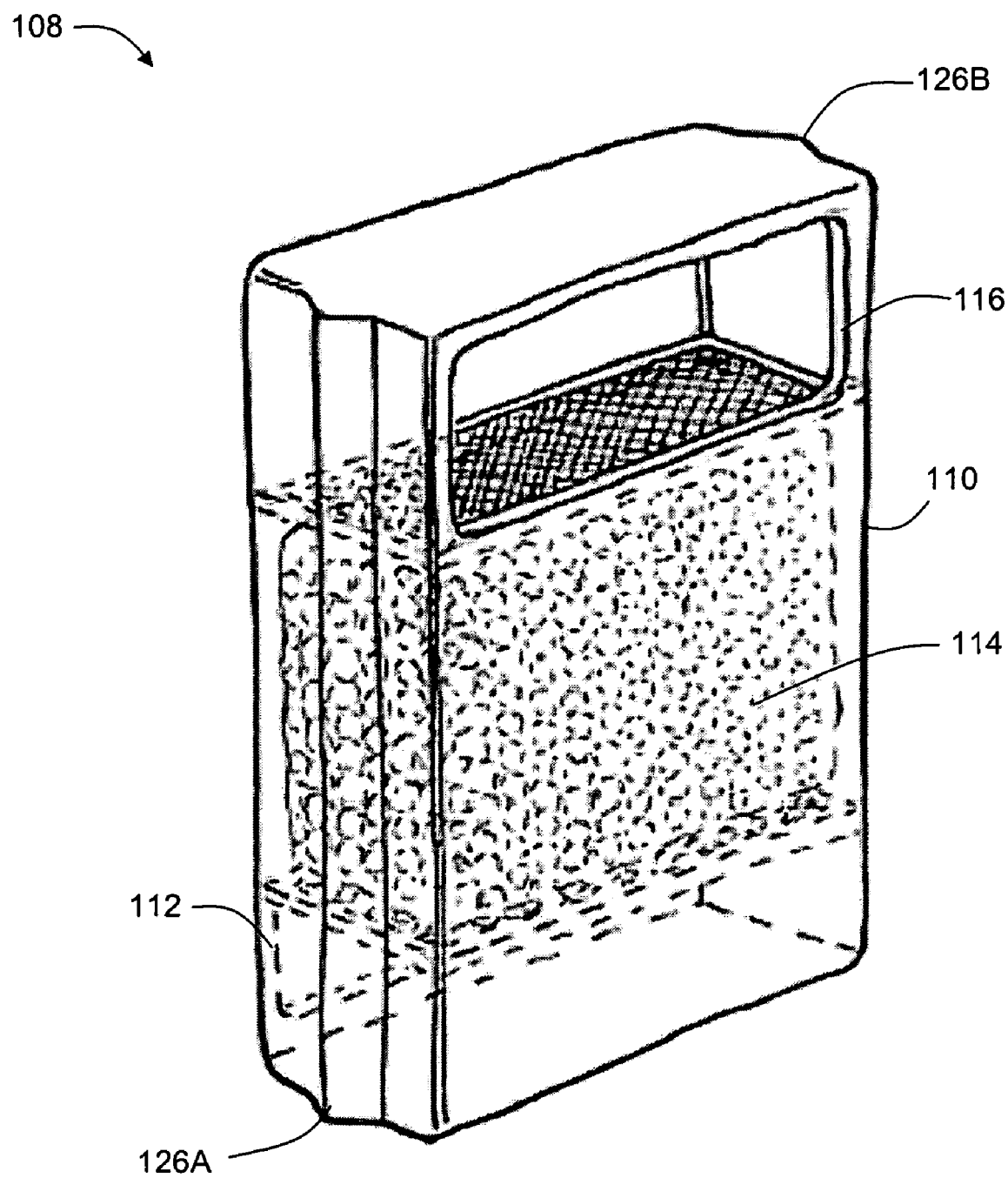
FIG. 5 illustrates a front perspective view of an example aquarium filter cartridge according to embodiments of the present invention for use in the aquarium filtration system of FIG. 1.

FIGS. 4 and 5 illustrate rear and front perspective views, respectively, of an example aquarium filter cartridge 108 according to embodiments of the present invention. As indicated above, the cartridge 108 may include a rectangular, preferably plastic, container or housing 110. Inside the housing 110, a filtration material or medium 114 such as activated carbon, zeolite, thermoplastic tubules or other materials is held. In some embodiments, the filtration medium 114 may be held in prepackaged netting or mesh webbing. Alternatively, the housing 110 may include grates or grills that swing open to allow bulk material to be poured into the housing 110.

The cartridge housing 110 is closed except for an entrance and an exit. A water entrance 112 is disposed along the bottom of the cartridge housing and is approximately 0.5 to 1.5 inches high to allow ingress of water on the side of cartridge 108 away from the aquarium. The entrance is designed to have a lowermost portion that it is substantially disposed at the bottom of canister 104 so that the water exerts a maximum water pressure to aid in the flow of the water through the filter medium. Furthermore, having a lowermost portion of the entrance disposed substantially at the bottom of the canister avoids having deadspot pools. In such deadspots, some water accumulates in front of a large lip portion without flowing through the filter, while other water that has more recently been filtered by the panel screening filter 106 flows over the pool and enters the cartridge for filtration.

An exit 116 is disposed at the top of the cartridge 108. Preferably it has a dimension between 0.5 to 1.5 inches high to allow egress of water out onto the spillway 118 (FIG. 1) or directly back into the fish tank. Exit 116 has a lowermost portion that is disposed to be substantially level with the top of spillway 118 so that water that has been filtered can easily exit. The particular height of the lowermost portion of the exit permits the water to flow most easily through cartridge 108 and through canister 104. Since the height that the water must be pumped is level with the spillway, no excess capacity needs to be required by the filtration pump. Accordingly, a smaller pump may be used and/or less power is consumed by the pump.

In some embodiments, the filtration medium 114 may be contained in the housing between the bottom of the upper entrance 116 and the top of the lower entrance 112 as shown in FIGS. 4 and 5. In other embodiments, the filtration medium 114 may extend above and/or below these points.

In some embodiments, the housing 110 may include hinges to allow the housing 110 to be opened to replace the filtration medium 114 and/or clean the housing. In alternative embodiments, the housing may be designed to come apart and snap back together using pressure fittings. In yet other embodiments, the top, bottom, and/or sides of the housing 110 may include doors that can be opened to provide access to the filtration material 114. In some embodiments, the entrance 112 and exit 116 may be dimensioned to allow replacement of the filtration medium 114. In such embodiments, the housing may include a through pin or releasable catch to support the filtration medium 114.

In an alternative embodiment of the filtration assembly 100, the panel screening filter 106 (FIG. 1) may include both floss filter material and charcoal material. In such embodiments a plurality of thermoplastic tubules may be disposed in the housing 110. Alternatively, thermoplastic tubules may be disposed with floss filter material on the panel screening filter 106 and charcoal material may be disposed in the housing 110.

Figure 6:
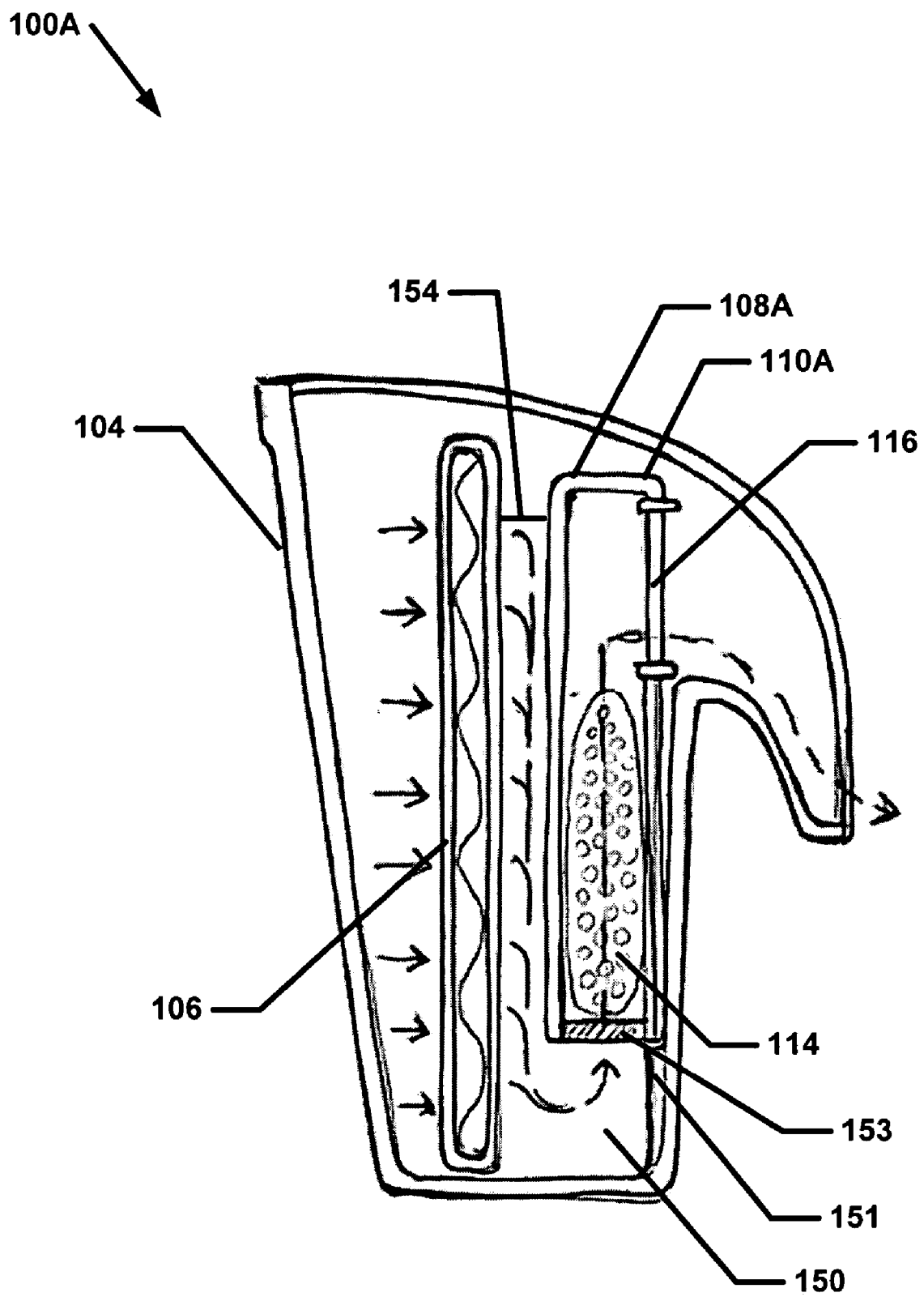
FIGS. 6, 7, and 8 illustrate a side plan views of a further embodiments of an aquarium filtration systems.
Figure 7:
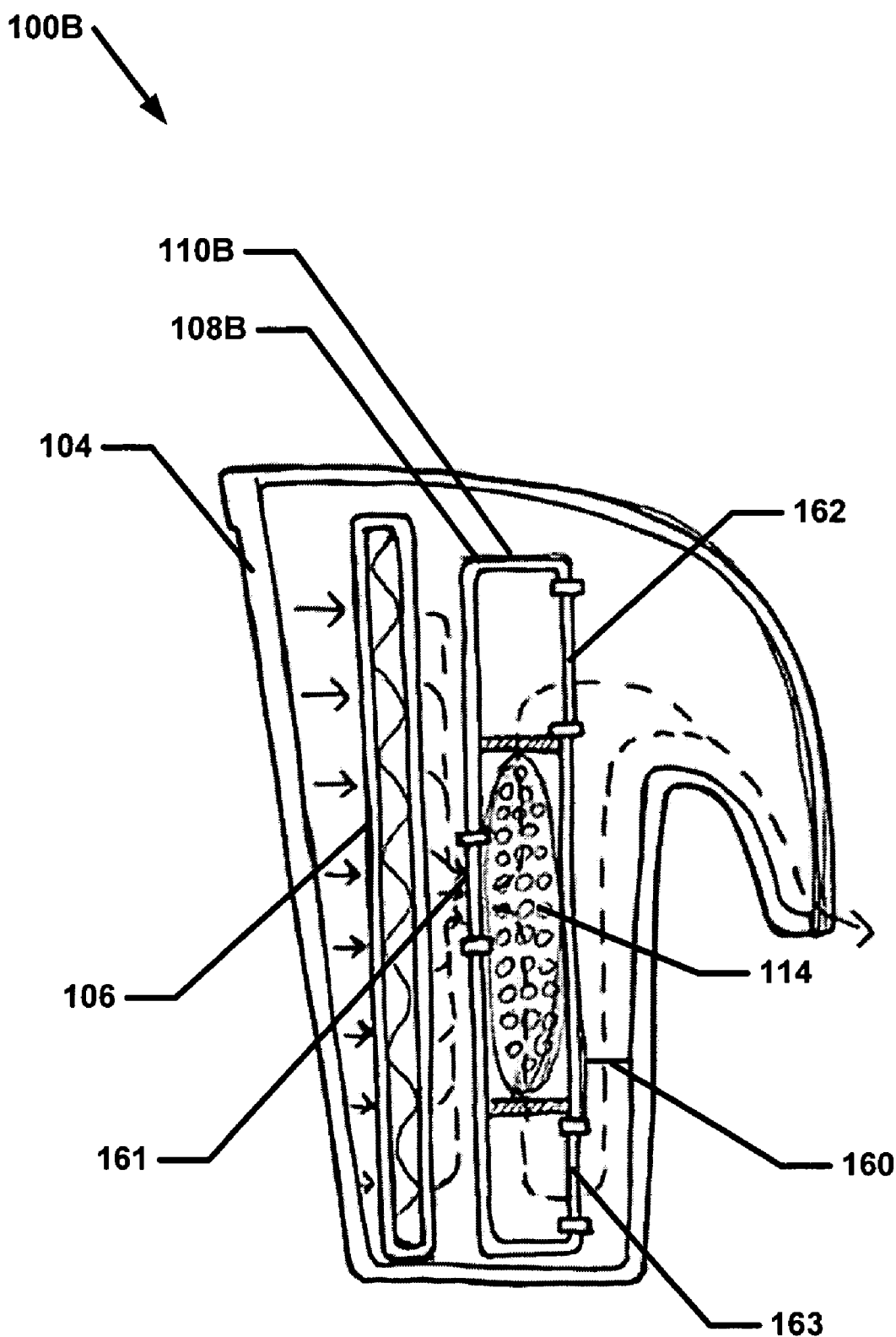
Figure 8:
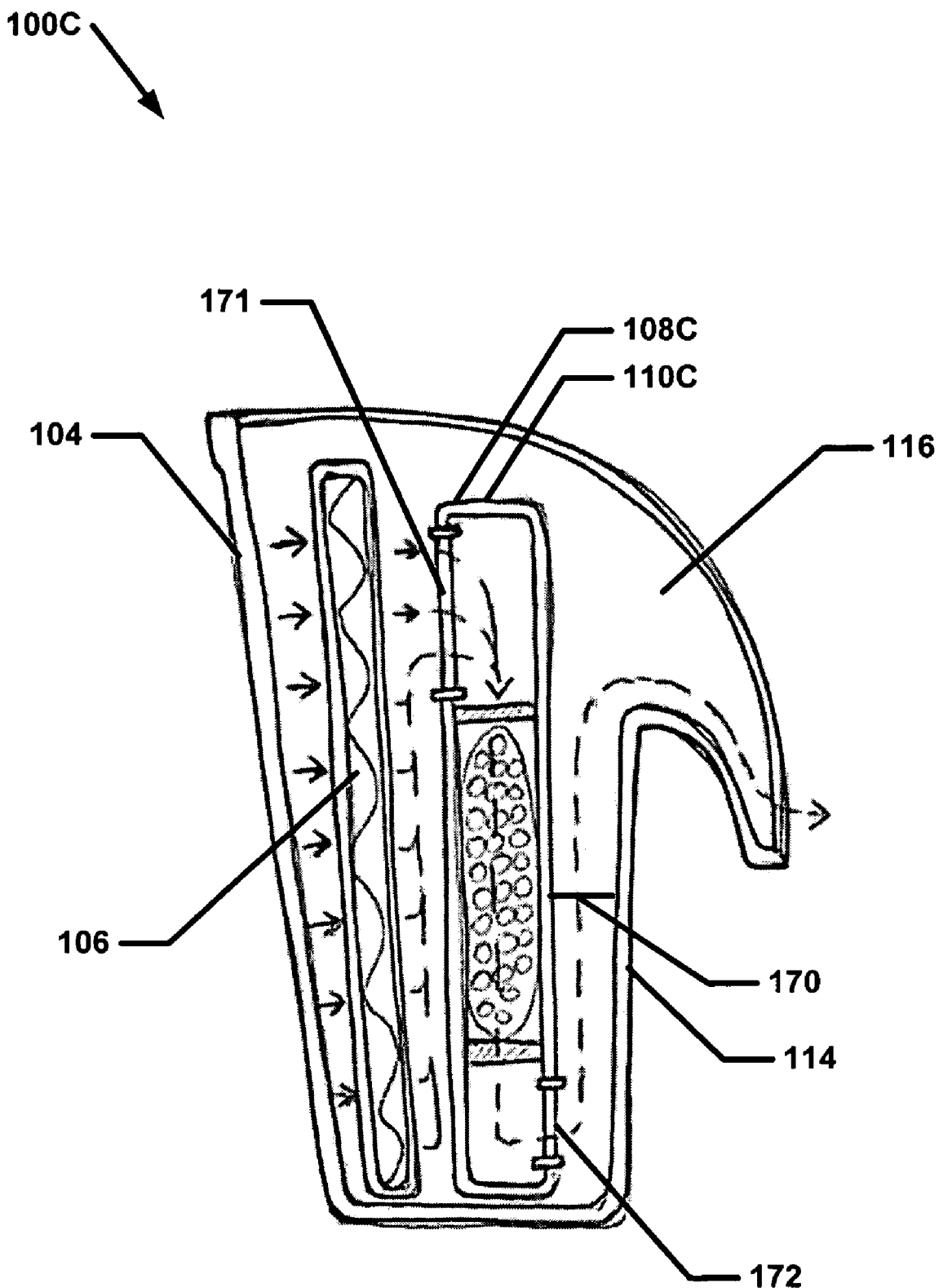

FIGS. 6, 7, and 8 illustrate further embodiments of a filtration assembly of the present invention having water flow paths that are distinct from those described previously herein. With reference to FIG. 6, a filtration assembly 100A is disposed in canister 104 and comprises panel screening filter 106 and filter cartridge 108A having a rectangular, preferably plastic, housing 110A. Inside the housing 110A, filtration material or medium 114, as described above, is held in a prepackaged netting or mesh webbing or is placed loosely in the cartridge.

In the present example, the cartridge is sized to be relatively short to permit the cartridge to be spaced apart from the bottom of canister 104 and create a space 150. To achieve this, cartridge 108A may be suitably held in place by features of canister 104 that act to retain the cartridge via it's top or side. Alternatively or in addition thereto, the cartridge 108A may be disposed to rest on a ledge 151 suitably integrated with or added to the canister 104.

In use, water flows through an upside down L shaped flow path. The water flows through panel screen 106 and then is blocked and redirected by housing 110A toward space 150. Since space 150 is disposed in a corner of canister 104, the water is directed to a bottom portion 152 of cartridge 108A. The bottom portion 152 may be covered by a grill 153 or the like that prevents filter material or medium 114 from exiting the cartridge and which may also serve to removable or adjustable so to remove used or inoperative filter material or medium 104 and refill the cartridge 108A with new filter material or medium 114.

The water then proceeds lengthwise through filter material 114. Because this path is lengthwise through the filter material rather than across the filter material, the water enjoys a longer dwell time and consequently better filtration before exiting through exit 116, the bottom portion of which is disposed substantially level with the canister's spillway.

In variations of this embodiment it should be appreciated that the gap 154 between the filter panel and housing 110A may be adjusted by several factors: the width of the cartridge 108A, placement of the cartridge 108A relative the panel filter 106, and adjustment of the width of ledge 151. Thus in one further embodiment by narrowing the gap 154 and widening cartridge 108A, a fast water flow is achieved through the panel filter. The water then enters the space 150 wherein it is slowed and from which a slow water flow meanders through filter material 114, i.e. cartridge 108A, permitting water to achieve better filtration.

With reference to FIG. 7, a filtration assembly 100B is disposed in canister 104 and comprises panel screening filter 106 and filter cartridge 108B having a rectangular, preferably plastic, housing 110B which is spaced from the forward edge of canister 104 by a gap 160. Inside the housing 110B, filtration material or medium 114, as described above, is held in a prepackaged netting or mesh webbing or is placed loosely in the cartridge.

In use, water being filtered creates a front feed path wherein the water flows through panel screen 106 and then is blocked and redirected by housing 110A toward entrance 161 located on the side of housing 110B closest to the panel filter. Preferably, entrance 161 is located approximately at the center of the front of the housing and may be rectangular opening along the housing length or a circular opening disposed at the housing's front side at the center. The water path divides into two paths to traverse the length of the filter medium between the entrance 161 and exits 162 and 163, which are located at preferably but necessarily the opposite housing wall and a relative top and bottom portion, respectively. This path also significantly increases dwell time over a path that is across the filtration material.

Exit 162 may be disposed substantially level with the canister's spillway or level with the spill way while exit 163 is disposed below the spillway and the water exiting at exit 163 needs to flow up along the side of canister 104 and exit the spillway.

The water then proceeds lengthwise through filter material 114. Because this path is lengthwise through the filter material rather than across the filter material, the water enjoys a longer dwell time and consequently better filtration before exiting through exit 116, the bottom portion of which is disposed substantially level with the canister's spillway.

With reference to FIG. 8, a filtration assembly 100C is disposed in canister 104 and comprises panel screening filter 106 and filter cartridge 108C having a rectangular, preferably plastic, housing 110C which is spaced from the forward edge of canister 104 by a gap 170. Inside the housing 110C, filtration material or medium 114, as described above, is held in a prepackaged netting or mesh webbing or is placed loosely in the cartridge.

In use, water being filtered creates a backwards S path wherein the water flows through panel screen 106 and then is blocked and redirected by housing 110A toward entrance 171 located on the side of housing 110C closest to the panel filter. Preferably, entrance 171 is located approximately at the top of the front of the housing and may be rectangular opening along the housing length or a circular opening disposed at the housing's front side at the center. The water then traverses the length of the filter medium to exit at exit 172, which is located at preferably but necessarily the opposite housing wall and a bottom portion of the housing. This path also significantly increases dwell time over a path that is across the filtration material.

Exit 172 and entrance 171 may be sized so that one is larger than the other. For example, it may be advantageous to have entrance 171 be larger than the exit 172 since water pressure will assist the flow of water from exit 172. Thus, by varying the size a flow pressure may be created that is ideal for the canister and or for the aquarium. After exiting from exit 172 flows up along the side of canister 104 and exits the spillway.

Embodiments of the inventive filter cartridge and filtration system have been described here for illustration purposes only. Neither the specific embodiments of the invention as a whole, nor those of its features limit the general principles underlying the invention. In particular, the invention is not limited to any particular size or shape of the filter cartridge or of the filtration system, thickness of the filter cartridge walls or the filtration system walls, rate of water flow, means of moving water, etc. The specific features described herein may be used in some embodiments, but not in others, without departure from the spirit and scope of the invention as set forth. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention and it is not intended that the invention should be limited to any such embodiments, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A removable filter cartridge for cleaning aquarium water in an external-type aquarium filter system having a canister and a spillway, the filter cartridge comprising:
   an housing having a first and a second spaced-apart walls;
   an entrance at a lower portion of the first wall, the entrance having a lowermost portion and an uppermost portion;
   an exit at an upper portion of the second wall, the exit having a lowermost portion and an uppermost portion, the lowermost portion of the exit being substantially level with the spillway and being above the uppermost portion of the entrance; and
   a filtration medium for providing filtration functions for the aquarium water, the filtration medium disposed in a space defined between the first wall and the second wall;
   wherein the water follows a substantially S-shaped path between entering the filter cartridge from the canister and exiting the filter cartridge to the spillway.

2. The filter cartridge of claim 1 wherein the filtration medium is disposed above the uppermost portion of the entrance.

3. The filter cartridge of claim 1 wherein the filtration medium is disposed below the lowermost portion of the exit.

4. The filter cartridge of claim 1 wherein the housing is adapted to be selectively opened to allow the filtration medium to be replaced.

5. The filter cartridge of claim 1 wherein at least one of the entrance and the exit is adapted to allow the filtration medium to be replaced via the at least one of the entrance and the exit.

6. The filter cartridge of claim 1 wherein the S-shaped path provides an elongated flow path and an extended dwell time for aquarium water passed therethrough.

7. The filter cartridge of claim 1 wherein the filtration medium is self-contained and supported by the housing.

8. The filter cartridge of claim 1 wherein the housing supports the filtration medium.

9. The filter cartridge of claim 1 wherein the housing is adapted to allow a plurality of different types of filtration medium to be stacked within the housing such that aquarium water passes through the different types of filtration medium serially.

10. The filter cartridge of claim 1 wherein the lowermost portion of the entrance is disposed substantially at a bottom of the canister of the filter system.

11. The filter cartridge of claim 1 wherein the filtration medium is one of activated carbon, zeolite, and thermoplastic tubules.

12. The filter cartridge of claim 1 wherein the removable filter cartridge filters uses aerobic filtration to remove one of biological and chemical agents in the aquarium water.

13. A filtration assembly for cleaning aquarium water in an external-type aquarium filter system having a canister and a spillway, the filtration assembly comprising:
   a panel screening filter for filtering aquarium water; and
   a removable filter cartridge comprising
      an housing having a first wall and a second wall spaced apart;
      an entrance at a lower portion of the first wall, the entrance having a lowermost portion and an uppermost portion, the lowermost portion being disposed substantially at a bottom of the canister and adjacent the panel screening filter;
      an exit at an upper portion of the second wall, the exit having a lowermost portion and an uppermost portion, the lowermost portion of the exit being substantially level with the spillway; and
      a filtration medium for providing filtration functions for the aquarium water, the filtration medium disposed in a space defined between the first wall and the second wall;
      wherein the panel filter is disposed ahead of the filter cartridge in a flow path of the water and wherein the water follows a substantially S-shaped path between entering the filter cartridge from the canister and exiting the filter cartridge to the spillway.

14. The filtration assembly of claim 13 wherein the filtration medium is disposed above the uppermost portion of the entrance.

15. The filtration assembly of claim 13 wherein the filtration medium is disposed below the lowermost portion of the exit.

16. The filtration assembly of claim 13 wherein the housing is adapted to be opened to allow the filtration medium to be replaced.

17. The filtration assembly of claim 13 wherein at least one of the entrance and the exit allows the filtration medium to be replaced via the at least one of the entrance and the exit.

18. The filter cartridge of claim 13 wherein the S-shaped path provides an elongated flow path and an extended dwell time for aquarium water passed therethrough.

19. The filtration assembly of claim 13 wherein the filtration medium is self-contained and supported by the housing.

20. The filtration assembly of claim 13 wherein the housing supports the filtration medium.

21. The filtration assembly of claim 13 wherein the housing is adapted to allow a plurality of different types of filtration medium to be stacked within the housing such that aquarium water passes through the different types of filtration medium serially.

22. The filtration assembly of claim 13 wherein the lowermost portion of the entrance is disposed substantially at a bottom of the canister of the filter system.

23. The filtration assembly of claim 13 wherein in a water path through the assembly the panel screen filter is disposed prior to the removable filter cartridge.

24. The filtration assembly of claim 13 wherein the removable filter cartridge filters uses aerobic filtration to remove one of biological and chemical agents in the aquarium water.

25. The filtration assembly of claim 13 wherein the filtration medium is one of activated carbon, zeolite, and thermoplastic tubules.

26. The filtration assembly of claim 13 wherein the panel screen filter comprises thermoplastic tubules and the filtration medium comprises one of activated carbon and zeolite.

27. A removable filter cartridge for filtration of aquarium water in an external-type aquarium filter system having a canister and a spillway, the filter cartridge comprising:
   an housing having a first and a second spaced-apart walls;
   an entrance for aquarium water in the first wall, the entrance having a lowermost portion and an uppermost portion;
   an exit for aquarium water in the second wall, the exit having a lowermost portion and an uppermost portion, the lowermost portion is above the uppermost portion of the entrance; and
   a filtration medium for providing filtration functions for the aquarium water, the filtration medium disposed to permit a substantially S-shaped path for the aquarium water between entering the filter cartridge from the canister and exiting the filter cartridge to the spillway.

28. A removable filter cartridge for cleaning aquarium water in an external-type aquarium filter system having a canister and a spillway, the filter cartridge comprising:
   an housing having an inner space, a first wall, and a second wall;
   a filtration medium for providing filtration functions for the aquarium water, the filtration medium disposed in the inner space;
   an entrance in the first wall;
   a first exit in the second wall;
   wherein the water follows a substantially S-shaped path between the entrance and the first exit; and
   wherein the first and second walls are spaced apart.

29. The filter cartridge of claim 28 further comprising a second exit in the first wall, the second exit being spaced apart from the first exit, the entrance being located above the second exit and being located below the first exit.

30. The filter cartridge of claim 28 wherein the entrance is above the first exit.

31. The filter cartridge of claim 28 wherein the entrance is in a center of the first wall.

32. The filter cartridge of claim 28 wherein the housing is adapted to be opened to allow the filtration medium to be replaced.

33. The filter cartridge of claim 28 wherein the housing is adapted to allow a plurality of different types of filtration medium to be stacked within the housing such that aquarium water passes through the different types of filtration medium serially.

34. The filter cartridge of claim 28 wherein the filtration medium is one of activated carbon, zeolite, and thermoplastic tubules.

35. A filtration assembly for cleaning aquarium water in an external-type aquarium filter system having a canister and a spillway, the filtration assembly comprising:
- a panel screening filter for filtering aquarium water disposed prior to a removable filter cartridge in a flow path of the water; and
- the removable filter cartridge comprising
  - an housing having an inner space, a first wall, and a second wall;
  - a filtration medium for providing filtration functions for the aquarium water, the filtration medium disposed in the inner space;
  - an entrance in the first wall;
  - a first exit in the second wall;
  - wherein the water follows a substantially S-shaped path between entering the filter cartridge from the canister and exiting the filter cartridge.

36. The filtration assembly of claim 35, wherein the first and second walls are spaced apart.

37. The filtration assembly of claim 35, wherein the filter cartridge further comprises a second exit in the first wall, the second exit being spaced apart from the first exit, the entrance being located above the second exit and being located below the first exit.

38. The filtration assembly of claim 35, wherein the filter cartridge further comprises the entrance above the first exit.

39. A removable filter cartridge for cleaning aquarium water in an external-type aquarium filter system having a canister and a spillway, the filter cartridge comprising:
- an housing having an inner space, a first wall and a second wall;
- an entrance in the first wall;
- an exit in the second wall;
- a filtration medium for providing filtration functions for the aquarium water, the filtration medium arranged in the inner space such that a cross-section of the filtration medium comprises in a vertical axis a respective first dimension and in a horizontal axis a respective second dimension, the first dimension being larger than the second dimension, the cross-section being co-planar with a transverse plane of the canister; and
- wherein a path of the water from entering the entrance to exiting the exit comprises flow along the first dimension such that the path is maximized to improve filtration functions.

40. The filter cartridge of claim 39 wherein the exit comprises a lowermost portion that is substantially level with the spillway to discharge the water directly onto the spillway.

41. A filtration assembly for cleaning aquarium water in an external-type aquarium filter system having a canister and a spillway, the filtration assembly comprising:
- a panel screening filter for filtering aquarium water disposed prior to a removable filter cartridge in a flow path of the water; and
- the removable filter cartridge comprising
  - an housing having an inner space, a first wall and a second wall;
  - an entrance in the first wall;
  - an exit in the second wall;
  - a filtration medium for providing filtration functions for the aquarium water, the filtration medium arranged in the inner space such that a cross-section of the filtration medium comprises in a vertical axis a respective first dimension and in a horizontal axis a respective second dimension, the first dimension being larger than the second dimension, the cross-section being co-planar with a transverse plane of the canister; and
  - wherein a path of the water from entering the entrance to exiting the exit comprises flow along the first dimension such that the path is maximized to improve filtration functions.

* * * * *